United States Patent Office 3,529,022
Patented Sept. 15, 1970

3,529,022
PROCESS FOR RESOLUTION OF OPTICAL ISOMERS OF RACEMIC AMMONIUM PANTOATE BY PREFERENTIAL CRYSTALLIZATION
Hiromasa Nakamoto, Takaoka, Hideo Takeda, Oyabe, and Kazuyoshi Inada, Imizu-gun, Japan, assignors to Fuji Chemical Industries, Ltd., Toyama-ken, Japan
No Drawing. Filed Apr. 20, 1967, Ser. No. 632,217
Claims priority, application Japan, May 10, 1966, 41/29,087
Int. Cl. C07d 5/06
U.S. Cl. 260—535                                    10 Claims

ABSTRACT OF THE DISCLOSURE

A process is provided for obtaining optical isomers of racemic ammonium pantoate, which can be readily converted to the corresponding optically active pantolactones, by resolution through the utilization of preferential crystallization of a solution of ammonium pantoate, using a solvent selected from the group consisting of lower aliphatic alcohols, alkoxy-substituted ethanols, mixtures thereof and mixture thereof with water. Heretofore, it was not known that preferential crystallization could be utilized to obtain the aforementioned optical isomers.

---

This invention relates to a process for obtaining optically active compounds by resolution, through utilization of preferential crystallization, of those classes of compounds which were not known at all to be capable of being obtained by this technique in the past. More specifically, this invention relates to a process for the resolution of optical isomers of racemic ammonium pantoate by preferential crystallization, which is characterized in that to a saturated or supersaturated solution of racemic ammonium pantoate, in a solvent selected from the group consisting of lower aliphatic alcohols, alkoxy-substituted ethanols, the mixtures thereof and the mixture of these solvents with water, wherein one of either the D- or L-isomer is present in excess of the other, seed crystals of the optical isomer of racemic ammonium pantoate which is present in excess, is either added or not added, and thereafter the optical isomer of racemic ammonium pantoate which is present in excess is resolved by preferential crystallization by cooling.

The optically active ammonium pantoates which are resolved by crystallization according to the process of this invention readily form optically active pantolactones by the action of mineral acids. The optically active pantolactones, especially D-pantolactone, is a valuable material for synthesizing D-pantothenic acid, a member of the vtiamin B complex. This invention concerns a process for preparing the optically active ammonium pantoate which can provide this valuable optically active pantolactone by a simple process and hence at low cost.

The processes for preparing optically active pantolactones that were practiced heretofore, in all cases were processes comprising subjecting racemic pantolactones to the action of suitable optically active bases as the resolving agents, to derive a mixture of D- and L-pantoates, i.e., diastereoisomers, and thereafter recovering D- and L-pantolactones from the D- and L-pantoates. However, the operation of separating the disastereoisomers formed according to this process is complicated. Further, the separated diastereoisomers are in most cases contaminated by their antipodal diastereoisomers, with the consequence that there is the necessity for purification by means such as recrystallization, etc., thus making the commercial practice of the foregoing process a complicated matter. Further, the optically active bases which are used as the resolving agents are principally natural bases such as quinine and ephedrine. As these are costly, in commercial practice it becomes necessary to recover the resolving agent in high yield, and the complicated operations which attend this recovery step cannot be avoided. Hence, the resolving process by means of diastereoisomers cannot be regarded as being a commercially satisfactory process. However, since there was no advantageous process which could supersede it, the disadvantages were tolerated and it continued to be practiced.

This invention is directed to a process by which racemic ammonium pantoate, which is readily obtained by the reaction of racemic pantolactone and ammonia, is directly resolved into its optically active components by means of preferential crystallization. Thus, there is a commercial advantage in this process, in that a resolving agent is not necessary, as it was in the prior art processes which used the diastereoisomers. Further, there is the advantage that the hereinbefore described numerous shortcomings, which attend the prior art processes, are surmounted.

In general, the resolution by means of preferential crystallization cannot be practiced unless various conditions, such as the solubility difference between the racemic component and optically active component, the stability of the state of saturation and degree of crystallinity, are suitable, but organic compounds which satisfy these conditions are very scarce.

Generally speaking, it is a well-known fact in the optical resolution art that it is exceedingly difficult to predict the applicability of the preferential crystallization technique depending upon the class of the racemic compound to be resolved. Although it may be possible to utilize the preferential crystallization technique for the optical resolution of a given compound, it frequently happens that this technique cannot be utilized at all with another very similar compound.

For instance, it is known that glutamic acid, a member of the class of amino acids, is capable of optical resolution by means of preferential crystallization, but that aspartic acid, a member of the class of amino acids which closely resembles glutamic acid in chemical structure, cannot be optically resolved by preferential crystallization, even though it possesses the qualification that a racemic form is more readily soluble than the optically active form (Nature, 194, p. 768, 1962).

This is only one example, but the preferential crystallization technique is very unique in that predictability as to its applicability in the art of resolving optical isomers is exceedingly poor. As regards this lack of predictability, there is mentioned, for example, by Robert M. Secor in the Chemical Reviews, vol. 63, Introduction at p. 297, and p. 308 as follows:

"Application of this simple direct approach led to the discovery of many chemical compounds that could be resolved by crystallization. However, there were also many failures where all efforts to apply the direct crystallization method resulted in no measurable degree of resolution.

"It is surprising that in merely a century since the first reported resolution by seeded crystallization, there has appeared little in the form of a theory to predict when resolution is possible by this procedure and when it is not. As a result, most investigators of the crystallization phenomenon have relied heavily on empirical approaches." and "Although a wide variety of chemical compounds have been resolved by crystallization, it is not yet possible to predict whether or not resolution of a given racemic modification is possible."

Especially in the case of the substances related to pantolactones, there have hitherto been no proposals made whatsoever as to their resolution by preferential crystallization.

As a result of having investigated the possibility of carrying out the preferential crystallization of the pantoic acid derivatives (principally the salts), it has been discovered that ammonium pantoate satisfied the various conditions necessary for preferential crystallization. Thus, success has been achieved in producing the optical isomers of ammonium pantoate, which can be readily converted to optically active pantolactones, with simple operations and without using the costly resolving agents, and thus via a commercially favorable resolution process. Hence, it is possible to do away with the hereinbefore described resolution process which consisted of deriving the diastereoisomers, a process having the shortcomings hereinbefore indicated. Success has also been achieved in favorably providing the optically active pantolactones.

Furthermore, the preferential crystallization was possible only when this resolution by crystallization was carried out using the ammonium salt form of the racemic pantoate and a solvent consisting of either the lower aliphatic alcohols, alkoxy-substituted ethanols, a suitable mixture of the foregoing solvents, or a suitable mixture of these solvents and water.

According to the present invention, it has been found that ammonium pantoate forms a racemic mixture, and further, as shown in Table I, that the aforesaid solvents or the mixtures thereof with water had the requisite basic properties in that the solubility of a racemic modification therein was sufficiently greater than that of the optically active components, and the state of saturation was sufficiently stable for practicing the preferential crystallization method. Hence, this technique can be applied to the preferential crystallization of optically active ammonium pantoate with the contamination of the racemic modification held to a minimum.

It is therefore an object of this invention to overcome the technical disadvantages in the prior art processes and to provide a process for resolution in which optical isomers of ammonium pantoate, which can be readily converted to optically active pantolactones, can be produced commercially at low cost.

Another object is to provide a commercially advantageous and low-cost process for producing optically active pantolactones.

Other objects and advantages of this invention will be apparent from the following description.

According to this invention, it is possible to resolve by preferential crystallization the intended optically active ammonium pantoate by cooling a saturated or supersaturated solution of racemic ammonium pantoate containing an excess of either the D- or L-form of optically active ammonium pantoate, with or without seeding said solution with seed crystals of the optically active ammonium pantoate of the same form as that contained in excess therein.

TABLE I
[Solubility, g./100 ml., 15° C.]

| Solvent | Racemic ammonium pantoate | D- (or L-) ammonium pantoate |
| --- | --- | --- |
| Methanol | 30–38 | 10–14 |
| Ethanol | 26–34 | 3–5 |
| Methyl Cellosolve (containing 9% water) | 20–26 | 8–11 |

The resolving solvent to be used in the invention process must be one in which not only the ammonium pantoate is soluble but which can crystallize said salt without deteriorating it. Included are particularly the lower aliphatic alcohols such as methanol, ethanol, isopropanol, n-propanol and butanol, the alkoxy-substituted ethanols, especially the lower alkoxy-substituted ethanols, such as methyl Cellosolve and ethyl Cellosolve, suitable mixed solvents of these alcohols or alkoxy-substituted alcohols, or mixtures of these solvents with water.

Of those exemplified hereinabove, the lower aliphatic alcohols and the alkoxy-substituted ethanols of above three carbon atoms are preferably used in a mixed system with water.

There is no particular restriction as to the temperature used in the dissolving operation, but the use of heating conditions of above 70° C. is not desirable, since there is the danger that the decomposition of the ammonium pantoate will be brought about.

The racemic ammonium pantoate which is used in the resolution are white crystals (melting point 113–115° C.) which can be prepared by adding, to racemic pantolactone, ammonia water slightly in excess of the theoretical quantity and heating for 5 hours at 65–70° C. in a sealed state.

The resolved D- and L-ammonium pantoates can be converted by common procedure to D- and L-pantolactones. For instance, the D- and L-pantolactones can be obtained quantitatively by heating D- or L-ammonium pantoate with aqueous hydrochloric acid, distilling off the water to leave a solid matter, then adding an organic solvent such as acetone to the residue, followed by eliminating the ammonium chloride formed, and thereafter distilling off the acetone from the acetone solution. If necessary, purification by recrystallization from water or an organic solvent can be carried out.

The unit operation of the resolution by crystallization can be carried out by means of the known preferential crystallization technique. For instance, if to the aforesaid solvent solution, saturated or supersaturated with an excess of the D-form of ammonium pantoate after cooling, are added D-form seed crystals, the D-form crystallizes in a quantity which is about twice the total of the original excess quantity plus the quantity added as seed crystals. Although it is not necessarily required to add the seed crystals, the addition is preferably made. To the remaining mother liquor, which has the L-isomer in excess after separation of the crystallized D-isomer, are added racemic form crystals. When these are dissolved with heating and thereafter cooled, the L-form is crystallized in the same manner. The addition of L-form seed crystals, rather than no addition of L-form seed crystals, is to be preferred in this case also. If desired, the resolution can be carried out by repeating the addition of the racemic modification and the preferential crystallization.

Thus, according to this invention, the solvent mother liquor from which has been preferentially crystallized the optical isomer of ammonium pantoate, which is the same isomer as that originally present in excess, is again made into a saturated or supersaturated solution, with or without the further addition of racemic ammonium pantoate, and thereafter the solution is cooled and the seed crystals of the optical antipode of the isomer of ammonium pantoate which was suction-filtered off are added, to preferentially crystallize the same kind of isomer as the seed crystals, the resolution being carried out by repeating this operation, as required.

According to one mode of the invention process, to racemic ammonium pantoate, about 10% by weight thereof of one of the optically active forms is added, following which this is dissolved in a solvent and cooled to a temperature at which the saturation or supersaturation phenomenon is observed. This solution is then seeded with crystals of the same optically active form as added, and is stirred or allowed to stand still, thereby preferentially crystallizing the optically active ammonium pantoate in an amount which is about twofold that of the amount previously added. The mother liquor remaining after having carried out the preferential crystallization, is replenished with racemic ammonium pantoate in an amount approximating that of the active component which was crystallized, and dissolved therein with heating, after which the solution is seeded with seed crystals of the optical antipode of the optically active form previously crystallized. By treating the solution as before, optically active ammonium pantoate of the same class as the seed crystals can be preferentially crystallized, the amount obtained being about equal to the racemic modification added. By repeating this operation, D- and L-ammonium pantoate are alternately obtained efficiently from the same solution at the mother stock, and hence the optical resolution of racemic ammonium pantoate can be carried out very advantageously.

The pure product of D-ammonium pantoate has a melting point of 133°–134° C. $[\alpha]_D^{20}$ +8.0° (water, c.=5) and that of L-ammonium pantoate is 133°–134° C. $[\alpha]_D$ −8.8° (water, c.=5).

For further illustrating this invention, the following examples are given.

EXAMPLE 1

Thirty-one grams of racemic ammonium pantoate and 3 grams of D-ammonium pantoate were dissolved in 100 ml. of 20% hydrous isopropyl alcohol at 65°–70° C. This solution was seeded with seed crystals of D-ammonium pantoate and allowed to stand for 7 days at 0°–3° C. The precipitated crystals were collected by filtration to obtain 6.1 grams of D-ammonium pantoate. $[\alpha]$ +6.9°, optical purity 86.3%. 6.1 grams of racemic ammonium pantoate were added further to the mother liquor from which the D-ammonium pantoate crystals had been previously separated by filtration and were dissolved by heating. After cooling, the solution was seeded with L-ammonium pantoate seed crystals and was allowed to stand as before. The precipitated crystals were collected by filtration to obtain 4.8 grams of L-ammonium pantoate. $[\alpha]_D$ −7.9°, optical purity 89.5%.

EXAMPLE 2

Twenty grams of racemic ammonium pantoate were dissolved in 50 ml. of 10% hydrous methyl Cellosolve at 65° C., after which 2 grams of D-ammonium pantoate were added thereto and practically disolved therein by stirring for 30 minutes at the same temperature. With part of the D-ammonium pantoate still undissolved, the solution was cooled to 3–5° C., and stirred for 2 hours. Upon filtering and drying the precipitated crystals, 4.4 grams of D-ammonium pantoate were obtained. $[\alpha]_D^{20}$ +6.8°, optical purity 84.8%.

For converting this to D-pantoactone, 4.4 grams of said ammonium salt were dissolved in 5 ml. of water, to which were added 4 ml. of 35% hydrochloric acid. After heating this mixture for one hour at 90° C., the water was distilled off under reduced pressure. Thirty ml. of acetone were added to the residue and the insoluble matter was filtered off. The residue obtained by distilling off the acetone from the filtrate was recrystallized from trichloroethylene to yield 2.8 grams of D-pantoactone. $[\alpha]_D$ −48.3°.

The mother liquor from which was filtered off the D-ammonium pantoate was again heated to 65° C., and 4 grams of racemic ammonium pantoate were added and dissolved therein with heating. After seeding this solution with L-ammonium pantoate crystals and stirring for 2 hours at 3°–5° C., the precipitated crystals were collected by filtration. 3.9 grams of L-ammonium pantoate were obtained, $[\alpha]_D$ −8.1°, optical purity 91.8%.

2.7 grams of L-pantoactone were obtained from this salt by the operation as described above. $[\alpha]_D^{20}$ +49°.

EXAMPLE 3

A hundred and thirty-five grams of racemic ammonium pantoate and 8.1 grams of D-ammonium pantoate were disolved in 400 ml. of 95% ethanol by heating at 65°–70° C. following which this solution was seeded with 0.1 gram of D-ammonium pantoate. After stirring for 30 minutes followed by standing still for 5 hours, the crystals precipitated were collected by filtration and dried to yield 28.5 grams of D-ammonium pantoate. $[\alpha]_D$ +6.7°, optical purity 84.1%.

EXAMPLE 4

Seventy grams of racemic ammonium pantoate and 8.75 grams of D-ammonium pantoate were charged to a 500 ml. flask containing 200 ml. of 95% ethanol and dissolved therein by heating to 65°–70° C. The solution was then cooled to 20° C. and seeded with 0.5 gram of D-isomer. After stirring the solution for 20 minutes with a magnetic stirrer, it was allowed to stand still for 3.5 hours. The precipitated crystals were separated by filtration, washed with 20 ml. of ethanol and 15 ml. of acetone, and dried. 27.5 grams of D-ammonium pantoate crystals were thus obtained. After replenishing the mother liquor with the ethanol lost, racemic ammonium pantoate in an amount of 27.5 grams, an amount equal to the D-isomer previously crystallized, was added thereto and dissolved. Following the procedure described hereinabove, the solution was seeded with 0.5 gram of L-isomer and the L-isomer was crystallized by resolution.

This operation was repeated alternately for eight times with the D-, and L-isomers, with the results shown in Table II.

TABLE II

| No. of resolution | Optical activity of precipitated crystals | Magnetic stirring (min.) | Time stood still for crystallization (hr:min) | Yield (g) | $[\alpha]_D^{20}$ of aqueous solution in which ammonium pantoate was converted to pantolactone by N-HCl. (°) | Optical purity (percent) | Yield taking into consideration the optical purity (g.) |
|---|---|---|---|---|---|---|---|
| 1 | D | 20 | 3:10 | 27.5 | −34.2 | 67.5 | 18.05 |
| 2 | L | 20 | 3:25 | 23.7 | +41.4 | 82.0 | 18.90 |
| 3 | D | 20 | 3:20 | 22.4 | −40.0 | 79.0 | 17.16 |
| 4 | L | 20 | 3:30 | 19.6 | +45.1 | 90.2 | 17.70 |
| 5 | D | 20 | 3:25 | 25.4 | −39.2 | 77.5 | 19.18 |
| 6 | L | 20 | 3:00 | 26.1 | +46.0 | 85.0 | 21.65 |
| 7 | D | 20 | 3:25 | 28.7 | −40.3 | 80.0 | 22.45 |
| 8 | L | 20 | 3:22 | 23.9 | +43.9 | 86.0 | 20.08 |

The optical activity was measured in the following manner. 600–650 mg. of the D- or L-ammonium pantoate, which were crystallized, were weighed and charged into a 10 ml. measuring flask, to which about 9 ml. of n-hydrochloric acid were added. After heating this mixture for one hour at 90° C. to obtain a dilute hydrochloric acid aqueous solution of pantolactone and ammonium chloride, it was cooled. The optical activity of the pantolactone was then measured after accurately making the quantity 10 ml. with N-hydrochloric acid. The $[\alpha]_D^{20}$, obtained in this manner, for D- and L-pantolactone prepared from pure D- and L-ammonium pantoate, was −50° and +50°, respectively. Since this does not differ at all from the $[\alpha]_D^{20}$ values of pure D- and L-pantolactones in aqueous solution, the optical purity of the D- and L-ammonium pantoate can be obtained in this manner. Even in the case of D- or L-ammonium pantoate whose whose optical purity is on the order of 70%, it is possible, by dissolving these by heating at 70° C. in about a threefold volume of 95% ethanol and cooling to 0°–3° C., to readily obtain at a yield of 100–103% the D- or L-isomer having an optical purity of 99–100%.

We claim:

1. A process for the resolution of optical isomers of racemic ammonium pantoate, which comprises adding to a solvent selected from the group consisting of lower aliphatic alcohols, alkoxy-substituted ethanols, mixtures thereof and mixtures thereof with water, racemic ammonium pantoate and a member selected from the group consisting of D- and L-isomers of ammonium pantoate, heating the solution and then cooling the solution so that it becomes at least a saturated solution at about 20° C. in which one of the optical isomers is present in excess, seeding the solution with seed crystals of the same optical isomer of ammonium pantoate as that present in excess, and thereafter cooling said solution to resolve by preferential crystallization the optical isomer of ammonium pantoate which is present in excess.

2. The process according to claim 1, which comprises taking the mother liquor resulting from the preferential crystallization of the optical isomer, rendering said mother liquor at least a saturated solution, adding seed crystals of the optical antipode of said isomer, and thereafter cooling the solution to preferentially crystallize the said optical antipode.

3. The process according to claim 1, which comprises taking the mother liquor resulting from the preferential crystallization of the optical isomer, adding a racemic modification of ammonium pantoate in an amount sufficient to convert said mother liquor to at least a saturated solution, adding seed crystals of the optical antipode of said isomer, and thereafter cooling the solution to preferentially crystallize the said optical antipode.

4. The process according to claim 1, wherein said solvent is selected from the group consisting of methanol, ethanol, isopropanol, n-propanol, butanol, methyl Cellosolve, ethyl Cellosolve, mixtures thereof and mixtures thereof with water.

5. The process according to claim 1, wherein a temperature not exceeding 70° C. is used in dissolving said ammonium pantoate in said solvent.

6. A process for the resolution of optical isomers of racemic ammonium pantoate, which comprises adding to a solvent selected from the group consisting of lower aliphatic alcohols, alkoxy-substituted ethanols, mixtures thereof and mixtures thereof with water, racemic ammonium pantoate and a member selected from the group consisting of D- and L-isomers of ammonium pantoate, heating the solution and then cooling the solution so that it becomes at least a saturated solution at about 20° C. in which one of the optical isomers is present in excess, and thereafter cooling said solution to resolve by preferential crystallization the optical isomer of ammonium pantoate which is present in excess.

7. The process according to claim 6, which comprises taking the mother liquor resulting from the preferential crystallization of the optical isomer, rendering said mother liquor at least a saturated solution, adding seed crystals of the optical antipode of said isomer, and thereafter cooling the solution to preferentially crystallize the said optical antipode.

8. The process according to claim 6, which comprises taking the mother liquor resulting from the preferential crystallization of the optical isomer, adding a racemic modification of ammonium pantoate in an amount sufficient to convert said mother liquor to at least a saturated solution, adding seed crystals of the optical antipode of said isomer, and thereafter cooling the solution to preferentially crystallize the said optical antipode.

9. The process according to claim 6, wherein said solvent is selected from the group consisting of methanol, ethanol, isopropanol, n-propanol, butanol, methyl Cellosolve, ethyl Cellosolve, mixtures thereof and mixtures thereof with water.

10. The process according to claim 6, wherein a temperature not exceeding 70° C. is used in dissolving said ammonium pantoate in said solvent.

References Cited

Weissberger, part I, vol. III, 2nd ed., pp. 488–89.

ALEX MAZEL, Primary Examiner

A. M. T. TIGHE, Assistant Examiner

U.S. Cl. X.R.

260—343.6, 707